United States Patent
Chan (10) Patent No.: US 6,407,740 B1
(45) Date of Patent: Jun. 18, 2002

(54) ADDRESSABLE OUTPUT BUFFER ARCHITECTURE

(75) Inventor: Jeffrey Meng Wah Chan, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/164,074

(22) Filed: Sep. 30, 1998

(51) Int. Cl.[7] .............................................. G06F 15/16
(52) U.S. Cl. .................... 345/503; 345/558; 345/536
(58) Field of Search ................................. 345/501–506, 345/520, 522, 558, 419, 426, 536

(56) References Cited

U.S. PATENT DOCUMENTS

| | | | | |
|---|---|---|---|---|
| 5,671,401 A | * | 9/1997 | Harrell | |
| 5,821,950 A | * | 10/1998 | Rentschler et al. | 345/505 |
| 5,872,902 A | * | 2/1999 | Kuchkuda et al. | 345/430 |
| 5,877,773 A | * | 3/1999 | Rossin et al. | 345/434 |
| 5,999,196 A | * | 12/1999 | Storm et al. | 345/506 |
| 6,003,098 A | * | 12/1999 | Krech, Jr. | 710/51 |
| 6,137,497 A | * | 10/2000 | Strunk et al. | 345/434 |
| 6,181,346 B1 | * | 1/2001 | Ono et al. | 345/430 |

* cited by examiner

*Primary Examiner*—Ulka J. Chauhan
(74) *Attorney, Agent, or Firm*—Skjerven Morrill MacPherson LLP (57) ABSTRACT

Incoming geometry data are buffered in one or more buffers. The data are written to the buffers in an order which is not necessarily the order in which a processor or processors that construct images from the data need the data for fast processing. The data are provided to the processors in the order needed for fast processing. In some embodiments, fast processing involves starting critical path computations early. Examples of critical path computations are lighting computations which take more time than position computations. At least one processor has a pipelined instruction execution unit. The processor executes critical path computation instructions as long as a critical path instruction can be started without causing a pipeline stall. When no critical path instructions can be started without causing a stall, the processor starts a non-critical path instruction.

13 Claims, 3 Drawing Sheets

*Instruction*

| I1 | F | A | D | E1 | E2 | E3 | E4 | T | WB |
| I2 |   | F | A | D | o | o | o | E1 | E2 | E3 ... |
| I3 |   |   | F | A | o | o | o | D | E1 | E2 ... |
| I4 |   |   |   | F | o | o | o | A | D | E1 ... |

FIG. 3

*Instruction*

| I1 | F | A | D | E1 | E2 | E3 | E4 | T | WB |
| I3 |   | F | A | D | E1 | E2 | E3 | E4 | T | WB |
| I4 |   |   | F | A | D | E1 | E2 | E3 | E4 | T |
| I5 |   |   |   | F | A | D | E1 | E2 | E3 | E4 ... |
| I2 |   |   |   |   | F | A | D | E1 | E2 | E3 ... |

ADDRESSABLE OUTPUT BUFFER ARCHITECTURE

CROSS REFERENCE TO ATTACHED COMPACT DISK APPENDIX

A Compact Disk Appendix, of which two identical copies are attached hereto, includes Appendix 1 and Appendix 2. This Compact Disk Appendix forms a part of the present disclosure and is incorporated herein by reference. The Compact Disk Appendix contains the following files: Append~1.txt, 26 KB, Nov. 29, 2001, and Append~2.txt, 45 KB, Nov. 29, 2000.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to data processing, and more particularly to processing of computer graphics geometry data.

Constructing images from computer graphics geometry data (sometimes called computer graphics data) involves the pictorial synthesis of real or imaginary objects from their computer based models. Such image construction may require a large number of computations. The computations for each object may have to be frequently repeated if objects move or lighting parameters change. Therefore, it is desirable to increase the speed of the computer graphics geometry data processing.

SUMMARY

The present invention provides in some embodiments methods and apparatus for high speed processing of computer graphics geometry data. The incoming geometry data are buffered in one or more buffers. The data are written to the buffers in an order which is not necessarily the order in which a processor or processors need the data for fast processing. The data are provided to the processors in the order needed for fast processing.

In some embodiments, the geometry data processing has a critical path, and the data for the critical path are provided to the processors early, when the processors need such data. For example, in some embodiments, the lighting computations take more time than the position computations, and hence the lighting computations form a critical path. The position computations are performed by using processor resources not used for the lighting computations.

For instance, in some embodiments, the processor instruction execution is pipelined. The critical path instructions are spread out so as to avoid pipeline stalls that could be caused by data dependencies between instructions. More particularly, if for example an instruction I1 uses results of a previous instruction, and the previous instruction is still in the pipeline and its results have not become available, the instruction I1 may have to be stalled. In some embodiments, the critical path instructions are spread out so as to avoid such stalls or reduce their frequency. When a critical path instruction cannot be started without causing a stall, a non-critical path instruction is started. Thus, non-critical path instructions use instruction execution resources not used by critical path instructions. The geometry data processing therefore becomes faster.

Other features and advantages of the invention are described below. The invention is defined by the appended claims.

DESCRIPTION OF PREFERRED EMBODIMENTS

Figure 1:
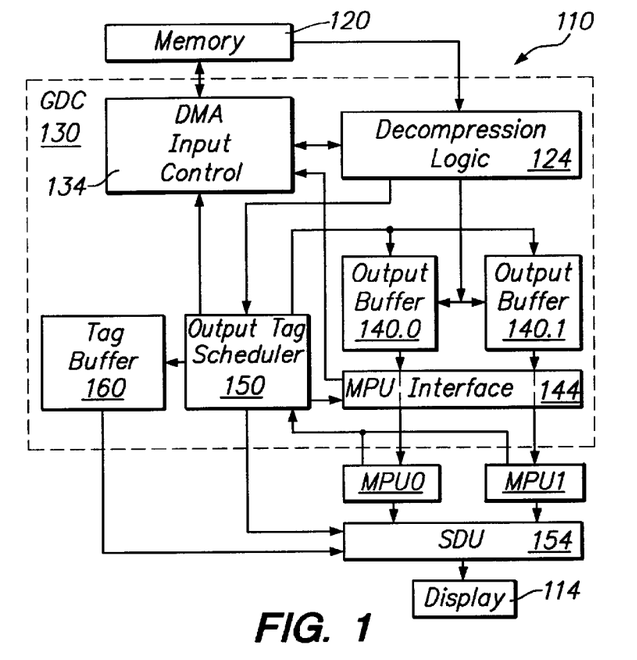
FIG. 1 is a block diagram of a computer system for processing geometry data according to the present invention.

FIG. 1 is a block diagram of a computer system 110 that constructs images from geometry data and displays the images on display 114. Compressed geometry data are read from memory 120 into decompression logic 124 of geometry decompressor (GDC) 130. This reading operation is controlled by DMA input controller 134. Decompression logic 124 decompresses the data and writes the decompressed data into output buffers 140.0, 140.1. Data from output buffer 140.0 are supplied to media processing unit MPU0. Data from output buffer 140.1 are supplied to media processing unit MPU1. Each MPU (that is, each of units MPU0, MPU1) is a pipelined VLIW (very long instruction word) processor. Data transfers from buffers 140.0, 140.1 to the MPUs are performed through MPU interface 144 under the control of output tag scheduler circuit 150 described in more detail below.

In some embodiments, decompression logic 124 uses algorithms described in Michael Deering, "Geometry Compression", Computer Graphics Proceedings SIGGRAPH 95 (Aug. 6–11, 1995), pages 13–20, incorporated herein by reference.

For each vertex of a triangle of an object to be displayed on display 114, the geometry data include the vertex coordinates ("position data" or "position coordinates"), normal vector coordinates ("normal data" or "normal coordinates"), and color and lighting parameters. The position and normal coordinates for each object are referenced to the object space coordinate system defined separately for each object to be displayed. The geometry data also include transform matrices used by the MPUs to obtain view space position coordinates and world space normal coordinates from the object space coordinates. The world and view space coordinates are referenced respectively to the world and view space coordinate systems. Each of these systems is a single system defined for the entire scene to be displayed.

Addendum A describes processing performed by the MPUs in some embodiments.

The position, normal, and color data for each single vertex are written into a single one of buffers 140.0, 140.1. Data for different vertices can be written to different buffers. The processing for any given vertex is performed by a single one of MPUs MPU0, MPU1. The MPUs write the processing results to set-up and draw unit (SDU) 154. For each vertex, output tag scheduler 150 writes a tag to tag buffer 160. The tag specifies which of the two MPUs processes the data for the vertex, and the tag provides some other information, as described in Addendum B. SDU 154 performs computations related to clipping to the screen area and also performs rasterizing. See also J. D. Foley et al., "Computer Graphics: Principles and Practice" (1996) incorporated herein by reference. SDU 154 writes the results to a frame buffer (not shown). The contents of the frame buffer are converted to an image on display 114 using methods known in the art.

Figure 2:
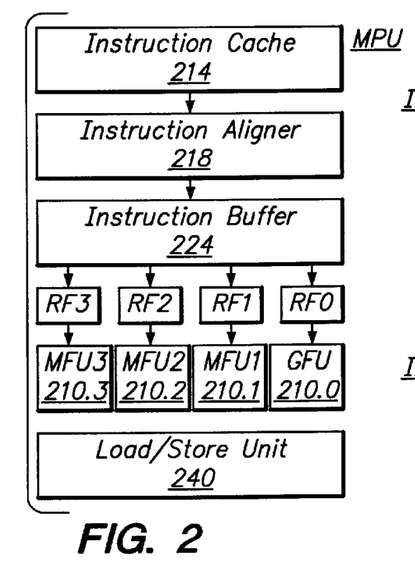
FIG. 2 is a block diagram of a processor used in the system of FIG. 1.

MPUs MPU0, MPU1 are identical. FIG. 2 is a block diagram of a single MPU. The MPU has four execution units 210.0, 210.1, 210.2, 210.3, also labeled GFU, MFU1, MFU2, MFU3 respectively. The four execution units operate in parallel to execute a single VLIW instruction. GFU stands for "general functional unit." MFU stands for "media functional unit". The three MFUs MFU1, MFU2, MFU3 are identical. The GFU is the only execution unit that can perform data load and store operations.

The MPU instruction execution pipeline (FIG. 3) includes stages F (fetch), A (align), D (decode), a number of execution stages E1, E2 . . . , a trap stage T, and a write back stage WB. During the F stage, the MPU fetches instructions from instruction cache 214 (FIG. 2) into instruction aligner 218. During the A stage, instruction aligner 218 extracts up to four individual short instructions to form a VLIW instruction and aligns the short instructions before respective execution units 210. The short instructions are written into instruction buffer 224. During the D stage, respective units 210 decode the short instructions and, if needed, read instruction operands from the respective register files RF0, RF1, RF2, RF3. Each register file RF0, RF1, RF2, RF3 stores the same data.

In the execution stages E1, E2, . . . , each execution unit 210 executes the respective short instruction. This portion of instruction execution is also pipelined, and in some embodiments each functional unit 210 has different E stage pipelines for different kinds of instructions.

At stage T, units 210 handle trap events.

At stage WB, execution units 210 write the instruction results to each register file RF0, RF1, RF2, RF3 and, possibly, to a data cache that caches data for an external memory (which may or may not be memory 120).

Load/store unit 240 buffers and executes requests to load instruction operands from an external memory, a data cache (not shown), GDC 130 or SDU 154 and to store operands in the data cache, a memory, the GDC or the SDU.

The MPUs read data from GDC 130 using memory mapped load requests. Similarly, the MPUs write data to SDU 154 using memory mapped store requests.

To speed up the geometry data processing, the computer program executed by the MPUs is written to start the critical path processing early. In Addendum A, the critical path includes the lighting computations (part II of Addendum A). The lighting computations are more extensive, and hence take longer, than the position coordinates transformation and clipping to a view volume (part I). Therefore, the lighting computations are started early. The non-critical path instructions, including the position coordinates transformation and the clipping to a view volume, are performed in parallel with the lighting computations, using the MPU resources not used by the lighting computations.

Figure 3:
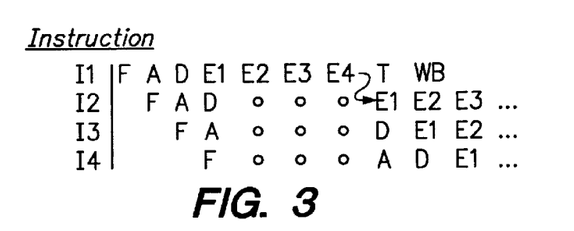
FIG. 3 illustrates instruction execution pipeline stages in a case in which the pipeline is stalled due to inefficient instruction ordering.

More particularly, since the MPUs are pipelined, the instructions performing the lighting computations and having data dependencies are spread out so as not to stall the MPU pipeline. A pipeline stall is illustrated in FIG. 3. In that figure, the VLIW instruction I2 uses the results of the instruction I1. The results of the instruction I1 become available to the instruction I2 after the instruction I1 execution stage E4. Therefore, the stage E1 of instruction I2 has to be delayed until after the stage E4 of instruction I1.

Figure 4:
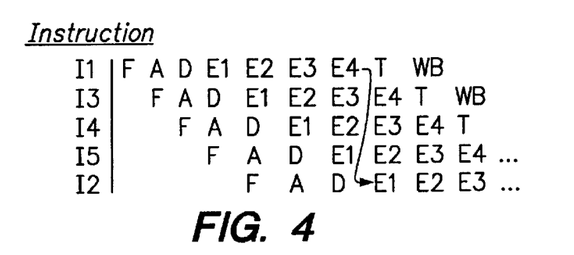
FIG. 4 illustrates instruction execution pipeline stages in a case in which a stall is avoided according to the present invention.

In FIG. 4, the instruction I2 is issued later than in FIG. 3 so that the stage E1 of instruction I2 does not have to be delayed. Instructions I3, I4, I5 are issued between instructions I1 and I2. Instructions I3, I4, I5 do not use the results of instruction I1 and hence do not have to be delayed. Therefore, the total execution time is reduced. The execution Rime reduction can be significant for geometry data processing because for some images the processing of Addendum A has to be performed for a large number of vertices.

Appendix 1 illustrates an assembly source code for a computer program executed by each of the MPUs. In Appendix 1, the lighting computations II-A (Addendum A) start at the VLIW instruction 1 (i.e. the instruction preceded by "! 1"; the VLIW instruction number is shown after the exclamation point at the beginning of each instruction, as explained in Addendum C). For instruction 1, the three MFUs 210.1, 210.2, 210.3 perform the following respective computations of Addendum A for vertices 1 and 2 of a 4-vertex batch (vertex batches are explained in Addendum D):

$$nx'=TNxx*Nx$$

$$ny'=TNxy*Ny \qquad (1)$$

$$nz'=TNxz*Nz$$

(See also Addendum C explaining the Appendix 1 code syntax and the correspondence between the variable names in Addendum A and the code.) The latency of the VLIW instruction 1 is 4 clock cycles (counting only the E stages). Therefore, the results of instruction 1 are not used until instruction 5. Instruction 5 uses the results to compute the following by the MFUs:

$$nx'=TNyx*Ny+nx'$$

$$ny'=TNyy*Ny+ny'$$

$$nz'=TNyz*Ny+nz'$$

Meanwhile, the VLIW instruction 2 performs the above computation (1) for different vertices 3 and 4, and VLIW instructions 3 and 4 start position coordinate transformation I-A (Addendum A). More particularly, instruction 3 performs the following computation for vertex 1:

$$W'=Twx*X+Tww$$

$$Y'=Txy*X+Twy$$

$$X'=Txx*X+Twx$$

Instruction 4 performs the same computation for vertex 2.

Figure 5:
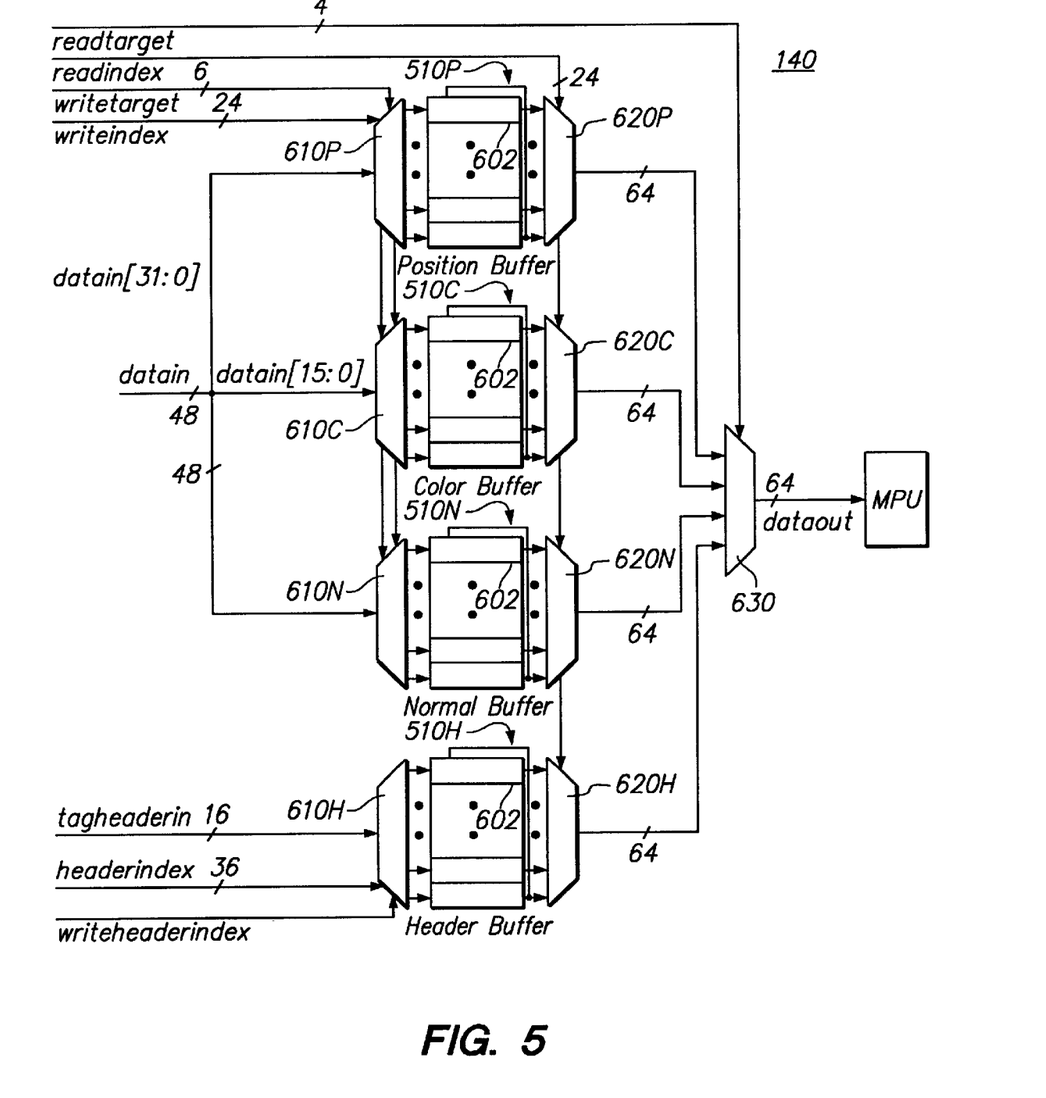
FIG. 5 is a block diagram of an output buffer which buffers geometry data in the system of FIG. 1.

FIG. 5 is a block diagram of a single output buffer 140 (one of buffers 140.0, 140.1; buffers 140.0 and 140.1 are identical to each other). Buffer 140 includes position buffer 510P, color buffer 510C, normal buffer 510N, and header buffer 510H.

Figure 6:
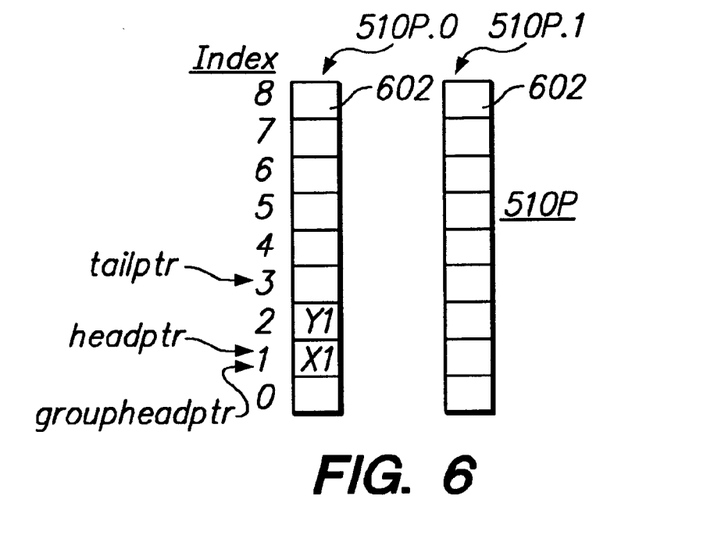
FIGS. 6 and 7 illustrate some of the output buffer registers at different stages of geometry data processing.
Figure 7:
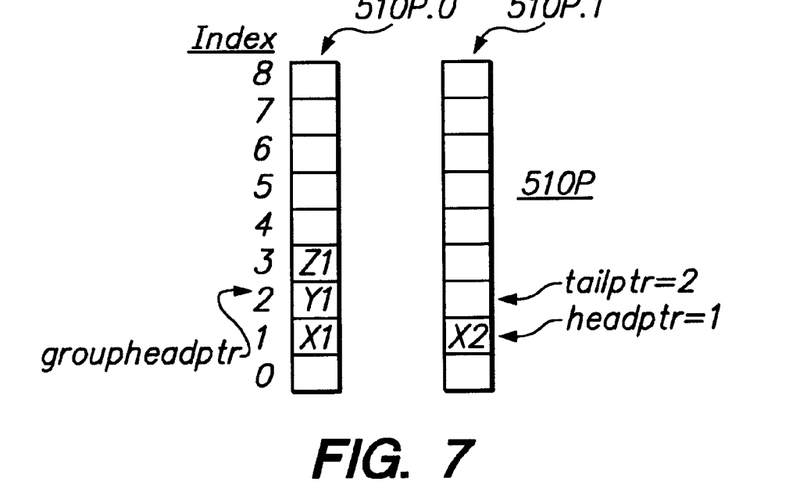

FIGS. 6 and 7 illustrate position buffer 510P. The color, normal and header buffers are similar. Position buffer 510P has two banks 0 and 1, also labeled 510P.0 and 510P.1 respectively. Each bank has nine 32-bit registers 602, indexed 0 through 8. Similarly, each of banks 0 and 1 (not shown) of color buffer 510C has 24 16-bit registers, each of banks 0 and 1 (not shown) of normal buffer 510N has nine 16-bit registers, and each of banks 0 and 1 (not shown) of header buffer 510H has three 16-bit registers.

Data inputs of buffers 510P, 510C, 510N, 510H are connected to outputs of respective demultiplexers 610P, 610C, 610N, 610H. Each demultiplexer 610 routes input data to appropriate registers of respective buffer 510. The 32-bit data input of demultiplexer 610P is connected to bus data in[31:0]. The 16-bit input of demultiplexer 610C is connected to bus datain[15:0]. The 48-bit input of demultiplexer 610N is connected to bus datain[48:0]. The bus datain receives position, normal and color data from decompression logic 124 (FIG. 1). When data for a vertex are written from decompression logic 124 to buffer 140, the position data are written to position buffer 510P, and the normal data are written to the normal buffer 510N. The remaining data, including the color information and the transform matrices, are written to color buffer 510C.

The select inputs of demultiplexers 610P, 610C, 610N receive signals writetarget and writeindex from output tag scheduler 150 (FIG. 1). The signal writetarget selects one of buffers 510P, 510C, 510N. The same signal also selects the bank 0 or 1 to write to. Signal writeindex specifies the index of the register to write to.

The 16-bit input of demultiplexer 610H is connected to bus tagheaderin which receives tags from output tag scheduler 150. The select inputs of demultiplexer 610H receive the following signals from tag scheduler 150:

writeheaderbank selects the bank to write to;

headerindex selects the register to write to.

The outputs of buffers 510P, 510C, 510N, 510H are connected to data inputs of respective multiplexers 620P, 620C, 620N, 620H. The select inputs of the four multiplexers receive signal readindex specifying the starting index of registers being read. This signal is generated by output tag scheduler 150. In position buffer 510P, readindex selects two 32-bit registers that have the same index in both banks 0 and 1 of the position buffer. For example, in FIG. 7, if readindex=1, X1 and X2 are read to the output of multiplexer 620P. In each of buffers 620C, 620N, 620H, four 16-bit registers are selected, including two registers at the readindex position and two registers at the next index position (the index is incremented in a circular manner).

Multiplexer 630 selects one of the 64-bit outputs of multiplexers 620P, 620C, 620N, 620H in response to select signal readtarget from output tag scheduler 150. The 64-bit output dataout of multiplexer 630 is supplied to an input of the respective MPU via MPU interface 144.

For each batch of two or four vertices (Addendum D), all the data for vertex 1 are written into banks 0 of buffers 510P, 510C, 510N, 510H. All the data for vertex 2 are written into banks 1. For 4-vertex batches, all the data for vertex 3 are written into banks 0, and all the data for vertex 4 are written into banks 1. Thus, for set 1, vertex 1 in Addendum D, the quantity nx12 (the normal coordinates Nx for vertices 1 and 2) is split so that the normal coordinate Nx1 for vertex 1 is stored in bank 0 of normal buffer 510N, and normal coordinate Nx2 of vertex 2 is stored in bank 1 of normal buffer 510N.

In some embodiments, each buffer 140 receives and stores all the data for a vertex (including position, normal, color, and header data) before receiving any data for any subsequent vertex.

Each bank of buffers 510 is maintained as a circular FIFO. Output tag scheduler 150 generates the following signals to maintain the FIFOs (see Addendum E listing the pseudo-code for some of the output buffer operations, and see Appendix 2 which includes source code for a simulation program for output tag scheduler 150):

(1) currentsubbuffer (value 0 or 1) is the current bank being written; this signal is shared by all the four buffers 510P, 510C, 510N, 510H.

(2) A separate set of the following signals is generated by output tag scheduler 150 for each of buffers 510P, 510C, 510N, 510H:

(2a) signal tailptr points to (i.e., is the index of) the next register to be written in the current bank in the respective buffer 510. Signal tailptr is initialized to 0 on power up. In FIG. 6, tailptr=3. In that figure, position data (X1, Y1, Z1) for vertex 1 are being written into bank 0 (i.e. bank 510P.0). Y1 has already been written into register 2 of bank 0, and Z1 has not been written yet. Z1 will be written at index tailptr=3. In FIG. 7, position data for vertex 2 are being written into bank 1 at tailptr=2.

(2b) headptr (set to −1 when the respective buffer is empty) points to the first valid register in the respective buffer (the first register which has been written but not read yet).

(2c) groupheadptr (initialized to 0 on power up) points to the first partially valid double entry if one is present. A double entry consists of two registers having the same index in both banks. A partially valid double entry is a double entry which has only been partially written. In FIG. 6, double entries 1 and 2 (i.e. double entries at indices 1 and 2) are partially valid. In FIG. 7, double entry 1 is valid, and double entry 2 is partially valid. Double entry 1 is ready to be read.

If there are no partially valid double entries, groupheadptr=tailptr.

In Appendix 2, the names of signals tailptr, headptr, and groupheadptr are prefixed with the respective buffer name "position", "color", "normal", or "header". For example, the position buffer signals are called positiontailptr, positionheadptr, positiongroupheadptr.

The above embodiments illustrate but do not limit the invention. In particular, the invention is not limited to the number of bits in any bus or register, to the number or presence of register banks, to any particular data structures such as FIFO, or to any other particular circuitry or parameters. Some embodiments include only one MPU, or more than two MPUs. In some processors, more than one execution units can perform load and store operations. Some embodiments use non-VLIW processors instead of MPUS. The invention is not limited to any instruction set or any latencies. Some embodiments do not involve geometry data compression or decompression. The invention is not limited to any particular structure of the geometry data. In some embodiments, the geometry data include textures or other structures known or to be discovered. Other embodiments and variations are within the scope of the invention, as defined by the appended claims.

Addendum A

I. Position Coordinates Transformation and Clipping to a View Volume

I-A Transform vertex position from model space to view space. (X, Y, Z) are model (object) space coordinates. (X', Y', Z', W') are homogeneous view space coordinates. Txx, Txy, etc. are transform matrix coefficients.

X'=Txx*X+Tyx*Y+Tzx*Z+Twx

Y'=Txy*X+Tyy*Y+Tzy*Z+Twy

Z'=Txz*X+Tyz*Y+Tzz*Z+Twz

W'=Txw*X+Tyw*Y+Tzw*Z+Tww

I-B Mark clip bits—perform clipping to a view volume. For each of the following inequalities, a bit is used in a clip register to indicate whether the inequality is true. Two bits are used for each double inequality, for a total of ten bits. These bits are written to SDU 154.

$-W'<X'<W'$
$-W'<Y'<W'$
$-W'<Z'<W'$
$-1.1*W'<X'<1.1*W'$
$-1.1*W'<Y'<1.1*W'$

I-C Screen space divide:

Below, (xs, ys, zs) are screen space coordinates. The triple (ox, oy, oz) is the origin of the view space coordinate system in screen space, oz being the depth. Scalars sx, sy, F are scaling coefficients.

$W1=1/W'$
$xs=X'*W1*sx+ox$
$ys=Y'*W1*sy+oy$
$zs=F*W1+oz$

Alternatively, $zs=F*Z'*W1+oz$

II. LIGHTING

II-A Transform normal. (Nx, Ny, Nz) are the normal coordinates in the object space. (nx', ny', nz') are the normal coordinates in the world space. TNxx, etc. are transform matrix coefficients.

$nx'=TNxx*Nx+TNyx*Ny+TNzx*Nz$
$ny'=TNxy*Nx+TNyy*Ny+TNzy*Nz$
$nz'=TNxz*Nx+TNyz*Ny+TNzz*Nz$

II-B Compute and normalize vertex view vector $Vx=TVxx*x''+TVyx*y''+TVzx*z''$
$Vy=TVxy*x''+TVyy*y''+TVzy*z''$
$Vz=TVxz*x''+TVyZ*y''+TVzz*z''$
$VdotV=Vx*Vx+Vy*Vy+Vz*Vz$
$normv=1/sqrt(VdotV)$
$Vx'=Vx*normV$
$Vy'=Vy*normV$
$Vz'=Vz*normV$ In Appendix 1, Vx', Vy', Vz' are constant, and the computation II-B is omitted.

II-C

Appendix 1 Embodiment (an OpenGL algorithm)

Get (r, g, b) data for the vertex from the GDC and transform them as follows:
$r=r*global\_ambient\_r+emission\_r$
  $+material\_diffuse\_r*light\_diffuse\_r*nl$
  $+material\_specular\_r*light\_specular\_r*I\{nl>0\}vr^{oe}$;
where $vr=nx'*lrv\_x, +ny'*lrv\_y+nz'*lrv\_z$,
  $nl=nx'*lln\_x+ny'*lln\_y+nz'*lln\_z$,
  lrv_x, lrv_y, lrv_z, lln_x, lln_y, lln_z, oe,
global_ambient_r, emission_r, material_diffuse_r, light_diffuse_r, material_specular_r, light_specular_r are constants (supplied to the MPUs as attributes),
  I{nl>0} is 1 if nl>0, and 0 otherwise;
  nl>=0 means the light source is behind the object. Similarly,
$g=g*global\_ambient\_g+emission\_g$
  $+material\_diffuse\_g*light\_diffuse\_g*nl$
  $material\_specular\_g*light\_specular\_g*I\{nl>0\}vr^{oe}$;
$b=b*global\_ambient\_b+emission\_b$
  $+material\_diffuse\_b*light\_diffuse\_b*nl$
  $+material\_specular\_b*light\_specular\_b*I\{nl>0\}vr^{oe}$ Alternate Embodiment Compute reflectance vector (Rx, Ry, Rz);
$NdotV=nx'*Vx'+ny'*Vy'+nz'*Vz'$
$Rx=2*(NdotV)*Nx'-Vx'$
$Ry=2*(NdotV)*NY'-Vy'$
$Rz=2*(NdotV)*Nz'-Vz'$ Emissive color+Ambient Light (#0)

(Er, Eg, Eb) are the RGB components of light emitted by the vertex (usually zero).

$r=Er+Ar*MAr$
$g=Eg+Ag*MAg$
$b=Eb+Ab*MAb$

Specular Light source #1

$NdotL=nx'*L1x'+ny'*L1y'+nz'*L1z'$
$NdotL=max(0, NdotL)$
$LdotR=Rx'*L1x'+Ry'*L1y'+Rz'*L1z'$
$LdotR=NdotL==0?0:max(0, LdotR)$
$r=r+MAr*L1Ar+NdotL*MDr*Dcr+pow(LdotR,oe)*MSr*slr$
$g=g+MAg*L1Ag+NdotL*MDg*Dcg+pow(LdotR,oe)*MSg*slg$
$b=b+MAb*L1Ab+NdotL*MDb*Dcb+pow(LdotR,oe)*MSb*slb$
$\{r=min(1, r)\} \{g=min(1, g)\} \{b=min(1, b)\}$ Specular Light source #2

$NdotL=nx'*L2x+ny'*L2y+nz'*L2z'$
$NdotL=max(0, NdotL)$
$LdotR=Rx'*L2x+Ry'*L2y+Rz'*L2z'$
$LdotR=NdotL==0?0:max(0, LdotR)$
$r=r+MAr*L2Ar+NdotL*MDr*Dc+pow(LdotR, oe)*MSr*slr$
$g=g+MAg*L2Ag+NdotL*MDg*Dc+pow(LdotR,oe)*MSg*slg$
$b=b+MAb*L2Ab+NdotL*MDb*Dc+pow(LdotR,oe)*MSb*slb$
$\{rs=min(1,r)\} \{gs=min(1,g)\} \{bs=min(1,b)\}$ Addendum B Tags Each tag is a 16-bit quantity, having bits [15:0]. bits [15:14] provide the following information on the corresponding data in output buffer 140.0 or 140.1 or both (attribute data are written into both buffers 140, data that describe vertices are written into only one of buffers 140, and mesh buffer references are not written to any buffer in some embodiments but are supplied to the SDU):

| Bits 15:14 | Meaning of corresponding data in buffer(s) 140 |
|---|---|
| 00 | Data describe a vertex to be processed by MPU0 |
| 01 | Data describe a vertex to be processed by MPU1 |
| 11 | Mesh buffer reference (see Michael Deering, "Geometry Compression", cited above) |
| 10 | Attribute data (for example, a transform matrix or a coefficient used in lighting computations (e.g., global_ambient_g)) |

For the vertex data (bits 15:14 are 00 or 01) and the mesh buffer reference (bits 15:14=11):
  bit 13 indicates whether the blending coefficient alpha is used (see E. Angel, "Interactive Computer Graphics: a Top-Down Approach with OpenGL" (1997) incorporated herein by reference);

bits 12:11 ("Replace" bits) indicate what the vertex replacement policy is (see "Geometry Compression" cited above);

bit 10 ("Push") indicates whether the corresponding data should be pushed into the mesh buffer.

For the vertex data:

bit 9 ("Draw") indicates whether the vertex is to be used to form a triangle;

bits 8:5 are unused;

bits 4:0 ("absolute MBR (mesh buffer reference) write") are an absolute mesh buffer write address when the Push bit (bit 10) indicates the vertex is to be pushed into the mesh buffer.

For the mesh buffer references:

bits 9:5 ("absolue MBR read") are an absolute mesh buffer read address;

bits 4:0 ("absolute MBR (mesh buffer reference) write") are an absolute mesh buffer write address when the Push bit (bit 10) indicates the vertex is to be pushed into the mesh buffer.

For the attribute data:

if bit 13 ("Token") indicates the attribute is in the form of a "token", then the attribute is specified indirectly as a memory address of the attribute data. Otherwise, the attribute is attribute data specified directly.

Bits [12:0] specify the attribute type (for example, a position or normal transform matrix, a color coefficient, etc.).

All the tags are written to the tag buffer. In addition, vertex tags for the MPU0 are written to the header buffer of output buffer 140.0; vertex tags for the MPU1 are written to the header buffer of output buffer 140.1. Attribute tags are written to both header buffers. Mesh buffer reference tags are not written to the header buffers in some operation modes. In other modes, the mesh buffer reference tags are written to the header buffer according to some load balancing algorithm.

Addendum C

Notes on the Assembly Code of Appendix 1

The assembly code of Appendix 1 processes set 1 of Addendum D.

In the code, text following each exclamation point "!" to the end of the line is a comment.

Each VLIW instruction is preceded by a comment line Consisting of the sequential instruction number (e.g. "!1"). Each VLIW instruction includes 4 short instructions. The first short instruction listed is executed by the GFU, and the following three instructions are executed by respective MFUG MPU1, MFU2, MFU3. For example, in VLIW instruction 1, "ldg" is executed by the GFU, and the computations of tri_nx12, tri_ny12, tri_nz12 are executed by MFUs MFU1, MFU2, MFU3 respectively.

Each short instruction ends with a semi-colon (;). An empty (blank) short instruction is the same as nop (no operation). See instruction 84 for an example.

All the operands are in the register files, and hence the latency of each instruction is known.

Some data formats and naming conventions are described in Addendum D. In the code of Appendix 1, the ldg instruction reads data into registers having the prefix "in_".

For example, nx12 is read into register in_tri_nx12 ("tri" stands for triangle). The world space or view space Coordinates are computed in a corresponding register without the "in_" prefix (e.g. register tri_nx12 for the Nx world coordinates of vertices 1 and 2.

For transform matrices, the correspondence between the coefficients in Addendum A and the code of Appendix 1 is as follows:

(TNxx, TNyx, TNzx)=(Nt00, Nt10, Nt20)
(TNxy, TNyy, TNzy)=(Nt01, Nt11, Nt21)
(TNxx, TNyx, TNzx)=(Nt02, Nt12, Nt22).
(Txx, Tyx, Tzx, Twx)=(mt00, mt10, mt20, mt30)
(Txy, Tyy, Tzy, Twy)=(mt01, mt11, mt21,mt31)
(Txz, Tyz, Tzz, Twz)=(mt02, mt12, mt22, mt32)
(Txw, Tyw, Tzw, Tww)=(mt03, mt13, mt23, mt33)

Each of the TN coefficients is 16 bits. Each TN coefficient is duplicated in a respective 32-bit NT register. For example, register Nt00 has two 16-bit identical values each of which equals TNxx. When performing a transform, each MFU acts as an SIMD (Single Instruction Multiple Data) processor, performing two 16-bit instructions. For example, the short instruction tri_nx12=Nt00* in_tri nx12 in VLIW instruction 1 is executed as follows:

(1) 16 MSBs of tri_nx12 receive TNxx (16 MSBs of Nt00) times 16 MSBs of in_tri_nx12, and (2) 16 LSBs of tri_nx12 receive TNxx (16 LSBs of Nt00) times 16 LSBs of in_tri_nx12.

In the position transform matrix, each mt element is stored in a 32-bit register.

Emission colors emission_r, emission_g, emission_b of Addendum A are 16 bit quantities. In the code, "emission_r12" is a 32-bit register storing emission_r for vertices 1 and 2. emission_g12, emission_b12, emission_r34, etc. are similar. Similar storage is used for the values of specular light components such as light_specular_r (lspec_r in Appendix 1).

Similar storage is used for the 16-bit r, g and b values. They are initially read into respective registers in_tri_r (e.g., in_tri_r12 for vertices 1 and 2), in_tri_g, in_tri_b, and computed in registers tri_r, tri_g, tri_b.

Values ox, oy, oz of Addendum A are stored in respective registers x_offset, y_offset, z_offset. Values sx, sy, F are stored in x_scale, y_scale, z_scale. Values xs, ys, zs are stored in registers tri_x_p, tri_y_p, tri_z_p. Value oe is stores in pspoe.

Addendum D

Group Sets

A 256-bit "group" of information is read by an MPU in a single ldg ("load group") instruction. The group is read into 8 registers of each of register files RF0–RF3 (FIG. 2). The ldg instruction is performed in four clock cycles. In each cycle, a 64-bit quantity is read which represents the values listed in a single line in each group listing below. For example, for set 1, group 1, (nx12, ny12) is read in the first clock cycle, (nz12, nx34) is read in the second clock cycle, and so on till the end of group 1.

The ldg instruction has an "address" operand which specifies a "set" of groups to be read. Consecutive ldg instructions having the same address read consecutive groups of the respective set. The group is not explicitly specified by the ldg instruction.

Each position coordinate X, Y, Z is 32 bits. Each normal coordinate Nx, Ny, Nz is 16 bits.

The groups of each set include information on a batch of 2 or 4 vertices.

Accordingly, the MPU processes a batch of 2 or 4 vertices at a time. The vertices in each batch are numbered 1, 2 (for 2-vertex batches) or 1, 2, 3, 4 (for 4-vertex batches) in the order in which they are written into the corresponding output buffer 140.0 or 140.1. Below, "nx12" represents a 32-bit quantity including normal coordinates Nx for vertices 1 and 2. "n" stands for normal, "nx" for Nx. Similarly, ny12 is (Ny1, Ny2), i.e., the Ny coordinates for vertices 1 and 2; nx34 is the Nx coordinates for vertices 3 and 4 (for 4-vertex batches), and so on. An MPU reads each pair of normal coordinates (e.g. nx12, nz34, etc) into a single 32-bit register of the MPU register file (i.e. of each of the four register files; since the four register files RF1, RF2, RF3, RF4 store identical data, the programmer views them as a single register file, and we may sometimes refer to the four files as a single file).

The position and normal coordinates are referenced to the object coordinate space.

Each of the RGB vertex color components (r, g, or b) and a blending coefficient "a" (alpha) is 16 bits. r12 is a 32-bit quantity including the r values for vertices 1 and 2, a12 is the alpha values for vertices 1 and 2, b34 is the b values for vertices 3 and 4, and so on. Each of these 32-bit values is stored in a single MPU register.

Each 32-bit "header" includes two 16-bit tags for respective two vertices in the current or next batch of vertices. More particularly, "header34" (headers for vertices 3 and 4) is for the current batch of vertices, "header12" (for vertices 1 and 2) is for the next batch of vertices. The tags are described in Addendum B.

Values specr and spec_r (e.g. specr12, spec_r12) are specular light components "material_specular_r". This is similar for specb, etc. Values dz1, dz2 are z-displacement values for the displacement mapping. Values u12, v12 are texture coordinates.

Set 1: A batch of 4 vertices group 1:

| | |
|---|---|
| nx12 | ny12 |
| nz12 | nx34 |
| ny34 | nz34 |
| x1 | x2 | group 2:

| | |
|---|---|
| y1 | y2 |
| z1 | z2 |
| x3 | x4 |
| y3 | y4 | group 3:

| | |
|---|---|
| z3 | z4 |
| r12 | g12 |
| b12 | a12 |
| r34 | g34 | group 4:

| | |
|---|---|
| b34 | a34 |
| header34 | header12 |
| garbage | garbage |
| garbage | garbage |

Set 2: A batch of 4 vertices (used with specular color) group 1:

| | |
|---|---|
| nx12 | ny12 |
| nz12 | nx34 |
| ny34 | nz34 |
| x1 | x2 | group 2:

| | |
|---|---|
| y1 | y2 |
| z1 | z2 |
| x3 | x4 |
| y3 | y4 | group 3:

| | |
|---|---|
| z3 | z4 |
| r12 | g12 |
| b12 | a12 |
| specr12 | specg12 | group 4:

| | |
|---|---|
| specb12 | — |
| r34 | g34 |
| b34 | a34 |
| specr34 | specg34 | group 5:

| | |
|---|---|
| specb34 | — |
| header34 | header12 |
| — | — |
| — | — |

Set 3: A batch of 4 vertices for texture trim planes. Texture trim planes are edges of texture triangles.

group 1:

| | |
|---|---|
| x1 | x2 |
| y1 | y2 |
| z1 | z2 |
| x3 | x4 | group 2:

| | |
|---|---|
| y3 | y4 |
| z3 | z4 |

-continued

| | |
|---|---|
| r12 | g12 |
| b12 | a12 | group 3:

| | |
|---|---|
| r34 | g34 |
| b34 | a34 |
| header34 | header12 |
| — | — |

Set 4: A batch of 2 vertices with specular color group 1:

| | |
|---|---|
| nx12 | ny12 |
| nz12 | — |
| x1 | x2 |
| y1 | y2 | group 2:

| | |
|---|---|
| z1 | z2 |
| r12 | g12 |
| b12 | a12 |
| spec_r12 | spec_g12 | group 3:

| | |
|---|---|
| spec_b12 | — |
| — | header12 |
| — | — |
| — | — |

Set 5: A batch of 2 vertices (used with local lights) group 1:

| | |
|---|---|
| x1 | x2 |
| y1 | y2 |
| z1 | z2 |
| nx12 | ny12 | group 2:

| | |
|---|---|
| nz12 | — |
| r12 | g12 |
| b12 | a12 |
| — | header12 |

Set 6; A batch of 2 vertices (used with displacement Z) group 1:

| | |
|---|---|
| x1 | x2 |
| y1 | y2 |
| z1 | z2 |
| dz1 | dz2 | group 2:

| | |
|---|---|
| nx12 | ny12 |
| nz12 | — |
| r12 | g12 |
| b12 | a12 | header12—read with a "load word" instruction rather than "load group".

Set 7: A batch of 2 vertices (used with uv). (u, V, t) are three-dimensional texture coordinates.

group 1:

| | |
|---|---|
| x1 | x2 |
| y1 | y2 |
| z1 | z2 |
| nx12 | ny12 | group 2:

| | |
|---|---|
| nz12 | — |
| r12 | g12 |
| b12 | a12 |
| u12 | v12 | group 3:

| | |
|---|---|
| t12 | — |
| — | header12 |
| — | — |
| — | — |

Set 8: A batch of 2 vertices (texture uv)

group 1:

| | |
|---|---|
| nx12 | ny12 |
| nz12 | — |
| x1 | x2 |
| y1 | y2 | group 2:

| | |
|---|---|
| z1 | z2 |
| r12 | g12 |
| b12 | a12 |
| u12 | v12 | group 3:

| | |
|---|---|
| t12 | — |
| — | header12 |
| — | — |
| — | — |

Addendum E

Output Buffer Operation

Pseudocode for writing an output buffer (procedure BufferInputData in Appendix 2)

W1 Case when the data to be written is the X position coordinate

W1-1 (see procedure FindNextProcessor in Appendix 2): If a new group is being started, select output buffer: if the header buffer for MPU MPU1 has more free space than the header buffer for MPU MPU0, then select output buffer 140.0. Otherwise select output buffer 140.1. Current bank is 0.

W1-2 If this is not a new group, then flip the current bank (variable currentsubbuffer in Appendix 2) if current bank is =0, then set groupheadptr to the value of tailptr for each of the position, normal, color and header buffers. Otherwise set the tailptr to the value of groupheadptr for each of the four buffers.

W1-3 Check that the tag buffer has space for a new tag. If current bank is 0, check also that the header and position buffers have enough space. If they do not, generate a stall signal to decompression logic and skip the remaining steps.

W1-4 Generate tag and write it to tag buffer.

W1-5 Generated a header and write it to header buffer.

W1-6 Write the X coordinate to the position buffer at the tailptr position and update the tailptr pointer.

W2 Case when the data to be written is the Y or Z position data

W2-1 Check that the current output buffer has enough space in the position buffer in the current bank. If not, generate a stall signal to the decompression logic and skip the remaining steps.

W2-2 Write the position data into the current bank of the position buffer of the current output buffer at the tailptr position.

W3 Case when the data to be written is normal data

W3-1 Check that the current output buffer has enough space in the normal buffer in the current bank. If not, generate a stall signal to the decompression logic and skip the remaining steps.

W3-2 Write the normal data into the current bank of the normal buffer of the current output buffer.

W4 Case when the data to be written is color data

W4-1 Check that the current output buffer has enough space in the color buffer in the current bank. If not, generate a stall signal to the decompression logic and skip the remaining steps.

W4-2 Write the color data into the current bank of the color buffer of the current output buffer.

W5 Case when the data to be written is attribute or texture data

W5-1 Check that the current output buffer has enough space in the color and header buffers, and that the tag buffer has enough space for a tag. If not, generate a stall signal to the decompression logic and skip the remaining steps.

W5-2 Write the attribute or texture data into both banks of the color buffer of the current output buffer.

Reading the Output Buffer—Description

Each ldg instruction reads a whole 256-bit group (see Addendum D). The ldg instruction includes an address operand that specifies a set to read. The first ldg for the set reads group 1 of the set. Subsequent ldg instructions for the same MPU (MPU0 or MPU1) read subsequent groups consecutively to the end of the set, and must have an address specifying the same set. If an ldg instruction address specifies a different set before a previous set has been read to the end, an exception is generated.

The group being read is not explicitly specified by the ldg instruction.

Signals used by OutputTaqScheduler to read the Output Buffers:

For each processor (MPU0 or MPU1),currentrequest [processor] indicates which set the processor is processing. If currentrequest[processor] has a predefined value "NoRequest", the processor (i.e., the MPU) is not in the middle of processing any set, and a new request can issue to get the MPU to start processing any set. maxgroupcount [processor] is the number of groups in the set being processed by the respective MPU.

currentgroupcount[processor] is the index of the group being processed (currentgroupcount[processor] is 0 for group 1, is 1 for group 2, and so on).

currentoutputcount[processor] is the index of the 64-bit word in the group. For example, for set 1, group 1 (ADDENDUM D), the value currentoutputcount=0 corresponds to ($nx12$, $ny12$), the value of 1 corresponds to ($nz12$, $nx34$), and so on.

Pseudo-code for Reading an Output Buffer: R1 ("CheckRequests" in Appendex 2) For each ldg instruction, read four 64-bit double words consecutively. For each read of four 64-bit double words, generate signal request identifying the set to be read (the set is specified in the ldg instruction).

When a new request signal is generated, use the signal currentrequest and/or maxgroupcount to establish whether or not:

(1) the previous set of groups has been completely processed, and hence any set can be started as specified by the request signal (maxgroupcount is 0 in this case); or (2) the MPU has not finished the previous set.

In both cases, initialize currentrequest[processor] to an appropriate request value, maxgroupcount[processor] to an appropriate value, and currentoutputcount[processor] to 0. Then read the MPU output buffer ("R2" below).

R2—Read an output buffer ("SendDataOut" in Appendix 2):

Use currentoutputcount[processor] and currentgroupcount[processor] to determine and read appropriate data from the output buffer. Read the buffer as described in R3 below.

Increment currentoutputcount. When currentoutputcount reaches its maximum value in the group, increment currentgroupcount and reset currentoutputcount to 0.

R3—Reading a buffer B which is one of position, normal, color and header buffers ("SetOutput" in Appendix 2).

If ((groupheadptr=tailptr for the buffer, and current bank is 0)

or (headptr≠groupheadptr)) and if the number of double entries between headptr and groupheadptr is greater than or equal to the number of double entries to be read, then read the required number of double entries starting at headptr, and update headptr. If B is the position buffer, each double entry is 64 bits. If B is the normal or color buffer, each double entry is 32 bits, and hence 2 double entries are read in each clock cycle for the ldg instruction (the instruction takes 4 clock cycles).

What is claimed is:

1. An apparatus comprising:

one or more buffers for receiving geometry data in a first order;

one or more processors for processing the geometry data; and circuitry for reading the geometry data from the one or more buffers and providing the geometry data to the one or more processors;

wherein fast processing requires at least one processor P1 of the one or more processors to access the geometry data in a second order different from the first order, and the circuitry maintains a plurality of data structures in the one or more buffers, and writes respective position, normal or color data for any single vertex into a single one of the data structures in the one or more buffers, and to read a plurality of data structures in the one or more buffers to provide the geometry data to the processor P1 in the second order.

2. The apparatus of claim 1 wherein at least one of the buffers comprises:

a first buffer for storing position data;

a second buffer for storing normal data; and a third buffer for storing color data; and wherein the circuitry comprises a circuit for maintaining a data FIFO in at least one of the first, second and third buffers.

3. An apparatus comprising:

one or more buffers for receiving geometry data in a first order;

one or more processors for processing the geometry data; and circuitry for reading the geometry data from the one or more buffers and providing the geometry data to the one or more processors;

wherein fast processing requires at least one processor P1 of the one or more processors to access the geometry data in a second order different from the first order, the circuitry is operable to provide the geometry data to the processor P1 in the second order;

wherein at least one of the buffers comprises:

a first buffer for storing position data;

a second buffer for storing normal data;

a third buffer for storing color data;

wherein the circuitry comprises a circuit for maintaining a data FIFO in at least one of the first, second and third buffers;

wherein for at least one buffer B1 of the first, second and third buffers, the circuitry is to maintain a plurality of data FIFOs in the buffer B1, and to write respective position, normal or color data for any single vertex into a single one of the FIFOs in the buffer B1, and to read a plurality of FIFOs in the buffer B1 simultaneously to provide data in the second order.

4. The apparatus of claim 1 wherein:

the geometry data comprise (1) position data, (2) normal data, and (3) color data;

the processing comprises (1) processing the position data, and (2) determining color from the normal and color data;

determining color takes more time than processing the position data; and the processor P1 is to start determining color at the beginning of the geometry data processing by the processor P1, and the circuitry is operable to read the geometry data for the processor P1 in the order in which the processor P1 needs the data.

5. The apparatus of claim 1 wherein:

the processor Pi is to be controlled by a computer program;

the computer program comprises instructions for a critical path and instructions for a non-critical path;

the program is to cause the processor P1 to execute the instructions for the critical path, and to use resources not used for the instructions in the critical path to execute instructions in the non-critical path; and the circuitry is to give priority to reading the geometry data used early in the critical path.

6. The apparatus of claim 5 wherein:

the processor P1 instruction execution is pipelined, and the processor P1 is capable to start execution of an instruction before providing a result of another instruction whose execution has been started by the processor P1; and the processor P1 starts execution of non-critical path instructions when no critical path instructions can be started by the processor P1 without stalling an instruction execution pipeline of the processor P1.

7. A method comprising:

writing computer graphics geometry data to one or more buffers in a first order, the geometry data comprising position data, normal data, and color data;

maintaining data structures within the one or more buffers for at least one of the three types of geometry data, which are the position, normal, and color data;

writing the geometry data for the type of geometry data into one of the data structures;

reading the geometry data from the data structures for the type of data and processing the geometry data by one or more processors, wherein fast processing requires at least one processor P1 of the one or more processors to access the geometry data in a second order different from the first order, and the reading operation reads the geometry data from the data structures for the processor P1 in the second order.

8. The method of claim 7 wherein the method comprises maintaining a data FIFO for at least one of three types of data.

9. A method comprising:

writing computer graphics geometry data to one or more buffers in a first order; and reading the geometry data from the one or more buffers and processing the geometry data by one or more processors, wherein fast processing requires at least one processor P1 of the one or more processors to access the geometry data in a second order different from the first order, the reading operation reads the geometry data from the one or more buffers for the processor P1 in the second order;

wherein the geometry data comprise position data, normal data, and color data;

wherein the method comprises maintaining a data FIFO for at least one of three types of data which are the position, normal, and color data;

wherein for at least one of the three types of data, a plurality of FIFOs are maintained for said type of data, and data of said type for any single vertex are written into a single one of the FIFOs, and a plurality of FIFOs for said type of data are read simultaneously to provide data in the second order.

10. The method of claim 7 wherein:

the processing operation comprises (1) processing the position data, and (2) determining color from the normal and color data;

determining color takes more time than processing the position data; and the processor P1 starts determining color at the beginning of the geometry data processing by the processor P1, and the geometry data are read from the one or more buffers for the processor P1 in the order in which the processor P1 needs the data.

11. The method of claim 7 wherein:

the processor Pi is controlled by a computer program;

the computer program comprises instructions for a critical path and instructions for a non-critical path;

the program causes the processor Pi to execute the instructions for the critical path, and to use resources not used for the instructions in the critical path to execute instructions in the non-critical path; and the reading operation gives priority to reading the geometry data used early in the critical path.

12. The method of claim 11 wherein:

the processor P1 instruction execution is pipelined, and the processor P1 is capable to start execution of an instruction before providing a result of another instruction whose execution has been started by the processor P1; and the processor P1 starts execution of non-critical path instructions when no critical path instructions can be started by the processor P1 without stalling an instruction execution pipeline of the processor P1.

13. A computer readable medium comprising a plurality of instructions for processing computer graphics geometry data by a pipelines processor, the instructions comprising:

instructions for a critical path processing of the geometry data and instructions for a non-critical path processing of the geometry data, such that the processor is to start execution of non-critical path instructions when no critical path instructions can be started without stalling an instruction execution pipeline of the processor; and instructions for reading geometry data from one or more buffers in an order allowing the critical path instructions to get the geometry data as soon as the critical path instructions are ready to process the data.

* * * * *

UNITED STATES PATENT AND TRADEMARK OFFICE
CERTIFICATE OF CORRECTION

PATENT NO.   : 6,407,740 B1  Page 1 of 1
DATED        : June 18, 2002
INVENTOR(S)  : Jeffrey Meng Wah Chan It is certified that error appears in the above-identified patent and that said Letters Patent is hereby corrected as shown below:

<u>Column 18,</u>
Lines 5, 17 and 20 please delete "Pi" and insert therefore -- P1 --.

Signed and Sealed this

Eighteenth Day of March, 2003

JAMES E. ROGAN
*Director of the United States Patent and Trademark Office*